United States Patent
Park et al.

(10) Patent No.: US 10,044,846 B2
(45) Date of Patent: Aug. 7, 2018

(54) METHOD FOR EXECUTING DUAL OPERATING SYSTEMS OF SMART PHONE

(71) Applicant: SOOSAN INT CO., LTD, Seoul (KR)

(72) Inventors: Hyoung Bae Park, Seoul (KR); Kyoung Tae Kang, Seoul (KR)

(73) Assignee: SOOSAN INT CO., LTD, Gangnam-gu, Seoul (KR)

( * ) Notice: Subject to any disclaimer, the term of this patent is extended or adjusted under 35 U.S.C. 154(b) by 0 days.

(21) Appl. No.: 15/302,763

(22) PCT Filed: Apr. 10, 2015

(86) PCT No.: PCT/KR2015/003586
§ 371 (c)(1),
(2) Date: Oct. 7, 2016

(87) PCT Pub. No.: WO2015/156627
PCT Pub. Date: Oct. 15, 2015

(65) Prior Publication Data
US 2017/0041446 A1    Feb. 9, 2017

(30) Foreign Application Priority Data
Apr. 11, 2014 (KR) .......... 10-2014-0043811

(51) Int. Cl.
*H04M 1/67* (2006.01)
*H04W 12/08* (2009.01)
(Continued)

(52) U.S. Cl.
CPC ............ *H04M 1/673* (2013.01); *G06F 9/441* (2013.01); *G06F 21/31* (2013.01); *G06F 9/4401* (2013.01)

(58) Field of Classification Search
CPC ...... H04M 1/673; G06F 9/4401; G06F 21/31; G06F 9/441; G06F 8/62; G06F 9/5061;
(Continued)

(56) References Cited

U.S. PATENT DOCUMENTS 9,354,900 B2 *  5/2016  Abraham .............. G06F 9/4443
9,372,711 B2 *  6/2016  Galicia .................. G06F 9/461
(Continued)

FOREIGN PATENT DOCUMENTS

KR    20070079716 A    8/2007
KR    20120066894       6/2012
(Continued)

OTHER PUBLICATIONS

International Search Report dated Jul. 9, 2015 in corresponding International Application No. PCT/KR2015/003586.
(Continued)

*Primary Examiner* — Khawar Iqbal
(74) *Attorney, Agent, or Firm* — Sandberg Phoenix & von Gontard P.C.

(57) ABSTRACT

A smart phone according to an embodiment of the present invention suggests a method for accessing dual environments in a lock screen. The method may comprise: a step for receiving an inputted password or release pattern in a lock screen of a smart phone; and a step for providing smart phone environments different from each other according to the inputted password.

2 Claims, 4 Drawing Sheets

(51) Int. Cl.
*H04M 1/673* (2006.01)
*G06F 21/31* (2013.01)
*G06F 9/4401* (2018.01)

(58) Field of Classification Search
CPC ........ G06F 8/61; G06F 9/4451; G06F 9/4406; G06F 9/4403; G06F 9/46; G06F 9/48; G06F 9/445; G09G 5/14; H04B 1/40
See application file for complete search history.

(56) References Cited

U.S. PATENT DOCUMENTS

| | | | | |
|---|---|---|---|---|
| 9,389,877 B2* | 7/2016 | Galicia | ................ | G06F 9/441 |
| 9,513,928 B2* | 12/2016 | Hsieh | ................ | G06F 8/61 |
| 9,778,938 B2* | 10/2017 | Wilson | ................ | G06F 9/54 |
| 2013/0067242 A1* | 3/2013 | Lyakhovitskiy | ........ | G06F 21/00 |
| | | | | 713/193 |
| 2013/0097668 A1 | 4/2013 | Park et al. | | |
| 2013/0152074 A1* | 6/2013 | Yeh | ................ | G06F 8/61 |
| | | | | 717/178 |
| 2013/0219192 A1 | 8/2013 | Park et al. | | |
| 2013/0298141 A1* | 11/2013 | Wolfe | ................ | G06F 9/4443 |
| | | | | 719/319 |
| 2014/0283142 A1* | 9/2014 | Shepherd | ................ | G06F 3/0482 |
| | | | | 726/30 |
| 2014/0289537 A1* | 9/2014 | Parsons | ................ | G06F 21/575 |
| | | | | 713/193 |
| 2014/0298257 A1* | 10/2014 | Grandhi | ................ | G06F 3/0484 |
| | | | | 715/808 |
| 2015/0113635 A1* | 4/2015 | Yun | ................ | G06F 21/31 |
| | | | | 726/19 |
| 2015/0220737 A1* | 8/2015 | Rothman | ................ | G06F 21/572 |
| | | | | 726/1 |
| 2015/0264047 A1* | 9/2015 | Roy | ................ | H04L 63/0869 |
| | | | | 726/4 |
| 2015/0309657 A1* | 10/2015 | Park | ................ | G06F 3/0412 |
| | | | | 345/173 |
| 2016/0042162 A1* | 2/2016 | Newell | ................ | G06F 21/31 |
| | | | | 726/19 |
| 2016/0182530 A1* | 6/2016 | Lang | ................ | G06F 9/4555 |
| | | | | 710/14 |
| 2016/0187956 A1* | 6/2016 | Dolph | ................ | G06F 1/3212 |
| | | | | 713/320 |
| 2016/0196146 A1* | 7/2016 | Wilson | ................ | G06F 9/54 |
| | | | | 713/1 |
| 2016/0371095 A1* | 12/2016 | Zhou | ................ | G06F 8/62 |
| 2016/0378461 A1* | 12/2016 | Huang | ................ | G06F 13/42 |
| | | | | 717/169 |
| 2017/0090565 A1* | 3/2017 | Grandhi | ................ | G06F 3/013 |
| 2017/0329970 A1* | 11/2017 | Rothman | ................ | G06F 21/572 |
| 2018/0024871 A1* | 1/2018 | Takeuchi | ................ | G06F 9/54 |

FOREIGN PATENT DOCUMENTS

| | | |
|---|---|---|
| KR | 20130042295 A | 4/2013 |
| KR | 20130101632 A | 9/2013 |
| KR | 20130127900 A | 11/2013 |

OTHER PUBLICATIONS

Written Opinion dated Jul. 9, 2015 in corresponding International Application No. PCT/KR2015/003586.

* cited by examiner

METHOD FOR EXECUTING DUAL OPERATING SYSTEMS OF SMART PHONE

CROSS-REFERENCE TO RELATED APPLICATIONS

This application is the US National Stage of International Application PCT/KR2015/003586 which was filed Apr. 10, 2015, and published as WO2015156627, which derives priority from Korean App. No. 10-2014-0043811 filed Apr. 11, 2014 and which are hereby incorporated by reference.

TECHNICAL FIELD

Embodiments of the present invention relate to a method of running an operating system (OS) on a smart phone, and more particularly, to technology that provides a smart phone environment by unlocking a smart phone.

BACKGROUND

With the development of electronic communication technology, a user may use various features of a mobile phone. In particular, unlike an existing mobile phone in which only provided features are available, a smart phone allows the user to install, add, or delete various applications as desired, and also to access the Internet directly using a wireless-fidelity (Wi-Fi), and thus there is an increasing demand for smart phones.

Korean Patent Application Publication No. 2012-0066894 suggests a method for protecting private information on a mobile terminal that operates a mobile terminal based on an authority for use. However, the above patent application does not provide an independent use environment, but provides only a different execution range of apps based on the authority for use. Further, it has inconvenience in that to access another operating system (OS) from a default OS, an app to access another OS or launcher needs to be executed on the default OS.

Korean Patent Application Publication No. 2013-0101632 relates to a contents security system and method, and suggests that a first OS decrypts and processes contents with a high security level and a second OS decrypts and processes contents with a low security level. A plurality of OS s may be designed to be provided in a single mobile terminal. However, when the plurality of OS s operate at the same time, a collision between the OS s may arise. When executing a predetermined application and providing features on a website, advantages of an individual OS may not be utilized. Thus, a method of selectively running an OS is demanded. Accordingly, a method of accessing a predefined OS by inputting a password or pattern is needed.

SUMMARY

Technical Goals

An aspect of the present invention provides an operating method of a smart phone that may provide a different smart phone environment based on a password or unlock pattern input on a lock screen.

Technical Solutions

According to an aspect of the present invention, there is provided an operating method of a smart phone, the operating method including receiving a password input on a lock screen of the smart phone, and providing a different smart phone environment based on the input password.

The providing may include unlocking the smart phone and running a first operating system (OS) when the input password is a first password, and unlocking the smart phone and running a second OS when the input password is a second password.

The providing may include unlocking the smart phone and running a first launcher when the input password is a first password, and unlocking the smart phone and running a second launcher when the input password is a second password.

According to another aspect of the present invention, there is also provided an operating method of a smart phone, the operating method including receiving an unlock pattern input on a lock screen of the smart phone, and providing a different smart phone environment based on the input unlock pattern.

The providing may include unlocking the smart phone and running a first OS when the input unlock pattern is a first unlock pattern, and unlocking the smart phone and running a second OS when the input unlock pattern is a second unlock pattern.

The unlocking of the smart phone and running of the first OS may include installing the first OS on the smart phone through a cloud system and running the first OS when the first OS is not installed on the smart phone, and the unlocking of the smart phone and running of the second OS may include installing the second OS on the smart phone through the cloud system and running the second OS when the second OS is not installed on the smart phone.

The providing may include unlocking the smart phone and running a first launcher when the input unlock pattern is a first unlock pattern, and unlocking the smart phone and running a second launcher when the input unlock pattern is a second unlock pattern.

The unlocking of the smart phone and running of the first launcher may include installing the first launcher on the smart phone through a cloud system and running the first launcher when the first launcher is not installed on the smart phone, and the unlocking of the smart phone and running of the second launcher may include installing the second launcher on the smart phone through the cloud system and running the second launcher when the second launcher is not installed on the smart phone.

According to still another aspect of the present invention, there is also provided a smart phone including a touch screen configured to display a lock screen, and receive an unlock code input on the lock screen, and a processor configured to determine whether the unlock code is one of a plurality of predetermined unlock codes, and unlock the smart phone when the unlock code is one of the plurality of predetermined unlock codes.

The unlock code may be at least one of a password or an unlock pattern.

The processor may be configured to unlock the smart phone and provide a different smart phone environment based on the input unlock code.

The processor may be configured to run a different OS or launcher based on the input unlock code.

The processor may be configured to install the OS or launcher on the smart phone through a cloud system and run the OS or launcher when the OS or launcher to run is not installed on the smart phone.

Effect

According to an embodiment, an operating method of a smart phone may distinguish between a personal environment and a business environment by providing a different smart phone environment based on a password or unlock pattern that is input on a lock screen. Further, by distinguishing between the personal and business environments, private information on the smart phone may be secured.

DETAILED DESCRIPTION

Figure 1:
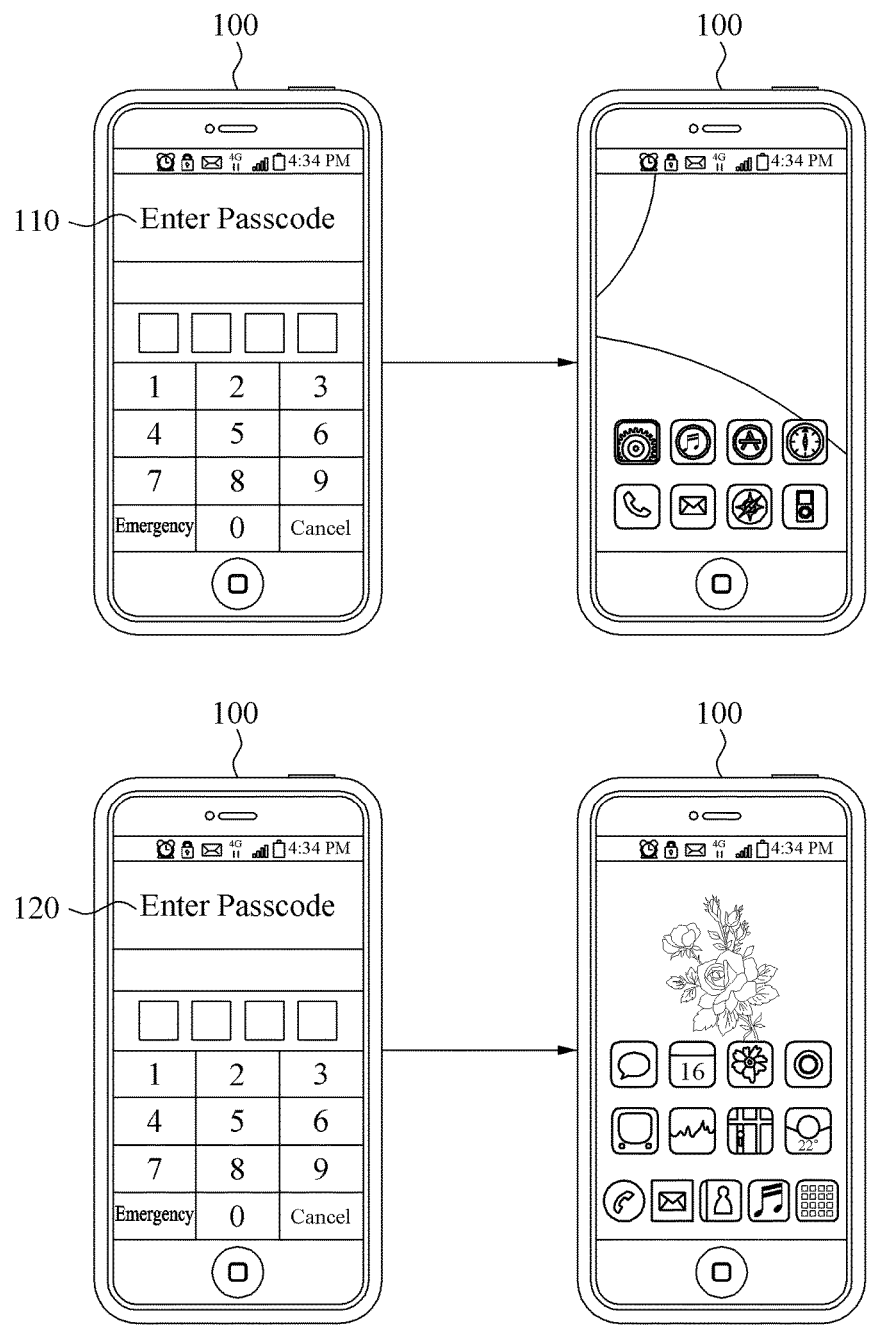
FIG. 1 illustrates examples of providing a smart phone environment based on a password input on a lock screen of a smart phone according to an embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates examples of providing a smart phone environment based on a password input on a lock screen of a smart phone according to an embodiment.

FIG. 1 illustrates cases in which a lock screen of a smart phone 100 requires a password. The smart phone 100 may receive a password input on the lock screen, and provide a different smart phone environment based on the input password. In this example, it may be assumed that two passwords are set up for the smart phone 100.

In a case 110 in which the password input into the smart phone 100 is a first password, the smart phone 100 may be unlocked and a first OS may be run. When the first OS is not installed on the smart phone 100, the first OS may be installed on the smart phone 100 through a cloud system and run.

In the case 110 in which the password input into the smart phone 100 is the first password, the smart phone 100 may be unlocked and a first launcher may be run. When the first launcher is not installed on the smart phone 100, the first launcher may be installed on the smart phone 100 through the cloud system cloud system and run.

In a case 120 in which the password input into the smart phone 100 is a second password, the smart phone 100 may be unlocked and a second OS may be run. When the second OS is not installed on the smart phone 100, the second OS may be installed on the smart phone 100 through the cloud system and run.

In the case 120 in which the password input into the smart phone 100 is the second password, the smart phone 100 may be unlocked and a second launcher may be run. When the second launcher is not installed on the smart phone 100, the second launcher may be installed on the smart phone 100 through the cloud system and run.

For example, it is assumed that passwords "0000" and "1111" are set for the smart phone 100. When the password input into the smart phone 100 is "0000", the smart phone 100 may be unlocked and the first OS may be run. When the password input into the smart phone 100 is "1111", the smart phone 100 may be unlocked and the second OS may be run. In this example, the first OS and the second OS may be Android, or the first OS may be Android and the second OS may be iOS. Further, by running a launcher, a desired style may be applied to an OS environment.

The same OS s or heterogeneous OS s may operate on a smart phone.

When an OS is not installed on a smart phone according to an embodiment, the smart phone may install the OS on the smart phone through a cloud system, and thus may execute an app without using an app processor and may not require a great amount of memory.

Figure 2:
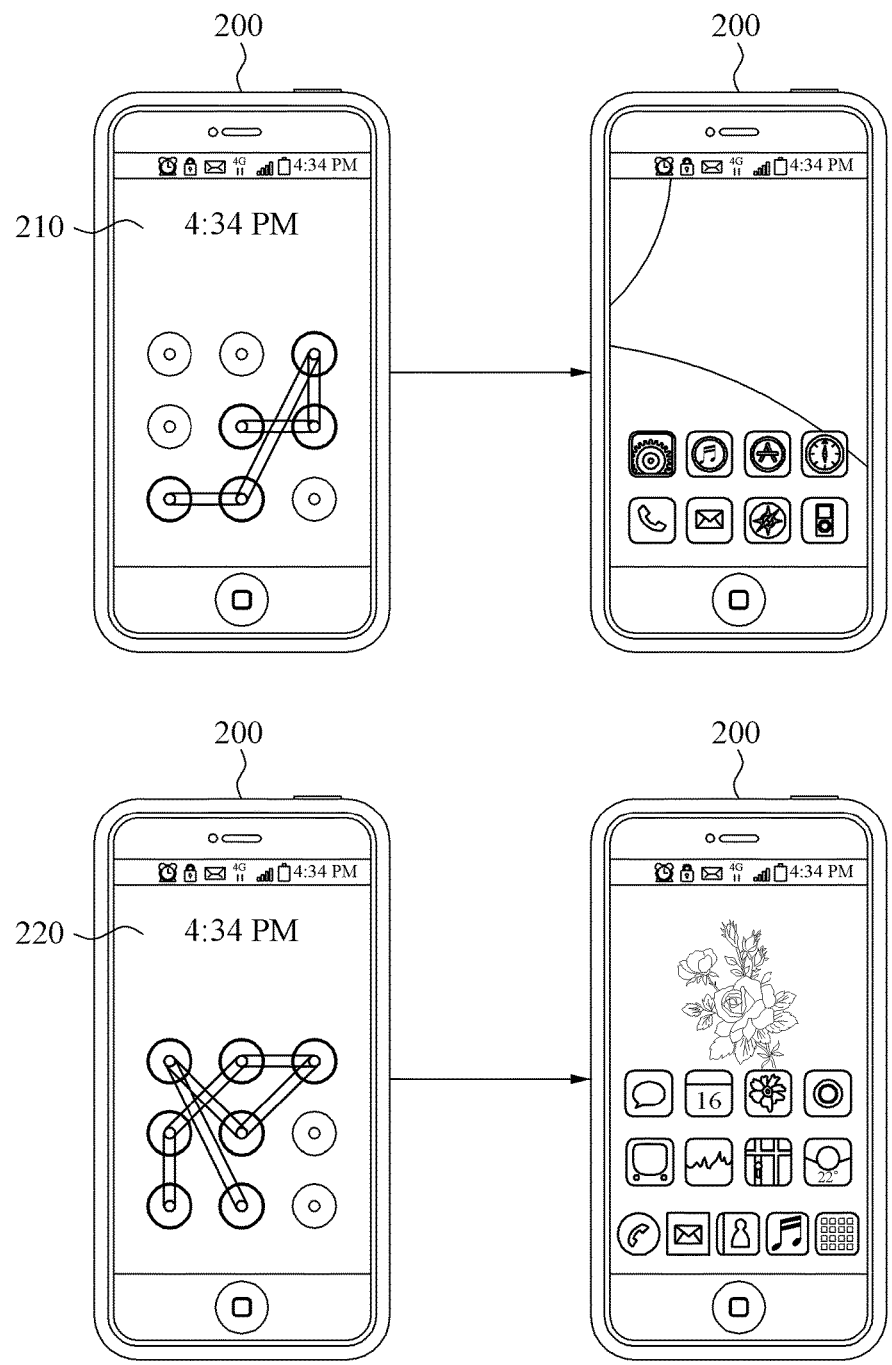
FIG. 2 illustrates examples of providing a smart phone environment based on an unlock pattern input on a lock screen of a smart phone according to an embodiment.

FIG. 2 illustrates examples of providing a smart phone environment based on an unlock pattern input on a lock screen of a smart phone according to an embodiment.

FIG. 2 illustrates cases in which a lock screen of a smart phone 200 requires a pattern. The smart phone 200 may receive an unlock pattern input on the lock screen, and provide a different smart phone environment based on the input unlock pattern. In this example, it may be assumed that two unlock patterns are set up for the smart phone 200.

In a case 210 in which the unlock pattern input into the smart phone 200 is a first unlock pattern, the smart phone 200 may be unlocked and a first OS may be run. When the first OS is not installed on the smart phone 200, the first OS may be installed on the smart phone 200 through a cloud system and run.

In the case 210 in which the unlock pattern input into the smart phone 200 is the first unlock pattern, the smart phone 200 may be unlocked and a first launcher may be run. When the first launcher is not installed on the smart phone 200, the first launcher may be installed on the smart phone 200 through the cloud system and run.

In a case 220 in which the unlock pattern input into the smart phone 200 is a second unlock pattern, the smart phone 200 may be unlocked and a second OS may be run. When the second OS is not installed on the smart phone 200, the second OS may be installed on the smart phone 200 through the cloud system and run.

In the case 220 in which the unlock pattern input into the smart phone 200 is the second unlock pattern, the smart phone 200 may be unlocked and a second launcher may be run. When the second launcher is not installed on the smart phone 200, the second launcher may be installed on the smart phone 200 through the cloud system and run.

For example, it is assumed that unlock patterns are set up for the smart phone 200 as shown in FIG. 2. When an unlock pattern input into the smart phone 200 is the same as shown in the case 210, the smart phone 200 may be unlocked and the first OS may be run. When the unlock pattern input into the smart phone 200 is the same as shown in the case 220, the smart phone 200 may be unlocked and the second OS may be run. In this example, the first OS and the second OS may be Android, or the first OS may be Android and the second OS may be iOS. The same OS s or heterogeneous OS s may operate on a smart phone.

A smart phone according to an embodiment may receive a password or unlock pattern being input, and provide a different OS environment based on the input password or unlock pattern.

Figure 3:
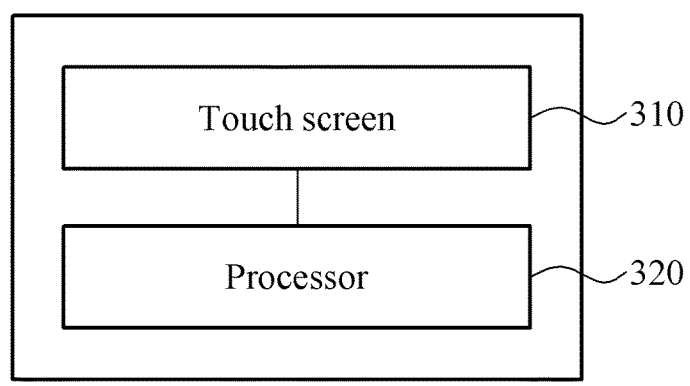
FIG. 3 is a block diagram illustrating a configuration of a smart phone according to an embodiment.

FIG. 3 is a block diagram illustrating a configuration of a smart phone according to an embodiment.

A smart phone 300 may include a touch screen 310 and a processor 320.

The touch screen 310 may display a lock screen, and receive an unlock code input on the lock screen. In this example, the unlock code may be at least one of a password or an unlock pattern. For example, the touch screen 310 may receive an unlock code input by a user on the touch screen 310 of the smart phone 300.

The processor 320 may determine whether the unlock code is one of a plurality of predetermined unlock codes, and unlock the smart phone 300 when the unlock code is one of the plurality of predetermined unlock codes. For example, when the unlock code is a password, the processor 320 may determine whether the password is one of predetermined passwords, and unlock the smart phone 300 when the password is one of the predetermined passwords. When the unlock code is an unlock pattern, the processor 320 may determine whether the unlock pattern is one of predetermined unlock patterns, and unlock the smart phone 300 when the unlock pattern is one of the predetermined unlock patterns.

The processor 320 may unlock the smart phone 300 and provide a different smart phone environment based on the input unlock code. In this example, it is assumed that the input unlock code is a password. When the input password is a first password, the processor 320 may unlock the smart phone 300 and run a first OS. When the input password is a second password, the processor 320 may unlock the smart phone 300 and run a second OS. In another example, it is assumed that the input unlock code is an unlock pattern. When the unlock pattern is a first unlock pattern, the processor 320 may unlock the smart phone 300 and run the first OS. When the input unlock pattern is a second unlock pattern, the processor 320 may unlock the smart phone 300 and run the second OS.

The processor 320 may run a different OS or launcher based on the input unlock code. When the input password is the first password, the processor 320 may unlock the smart phone 300 and run the first OS. In this example, when the password input into the smart phone 300 is the first password, the processor 320 may unlock the smart phone 300 and run a first launcher. Further, when the input password is the second password, the processor 320 may unlock the smart phone 300 and run the second OS. In this example, when the password input into the smart phone 300 is the second password, the processor 320 may unlock the smart phone 300 and run a second launcher.

When the unlock pattern is the first unlock pattern, the processor 320 may unlock the smart phone 300 and run the first OS. In this example, when the unlock pattern input into the smart phone 300 is the first unlock pattern, the processor 320 may unlock the smart phone 300 and run the first launcher. Further, when the input unlock pattern is the second unlock pattern, the processor 320 may unlock the smart phone 300 and run the second OS. In this example, when the unlock pattern input into the smart phone 300 is the second unlock pattern, the processor may unlock the smart phone 300 and run the second launcher.

When an OS or launcher to run is not installed on the smart phone 300, the processor 320 may install the OS or launcher on the smart phone 300 through a cloud system and run the OS or launcher. For example, when the first OS is not installed on the smart phone 300, the processor 320 may install the first OS on the smart phone 300 through the cloud system and run the first OS. When the second OS is not installed on the smart phone 300, the processor 320 may install the second OS on the smart phone 300 through the cloud system and run the second OS. Further, when the first launcher is not installed on the smart phone 300, the processor 320 may install the first launcher on the smart phone 300 through the cloud system and run the first launcher. When the second launcher is not installed on the smart phone 300, the processor 320 may install the second launcher on the smart phone 300 through the cloud system and run the second launcher.

An operating method of a smart phone according to an embodiment may distinguish between a personal environment and a business environment by providing a different smart phone environment based on a password or unlock pattern that is input on a lock screen. Further, by distinguishing between the personal and business environments, private information on the smart phone may be secured.

Figure 4:
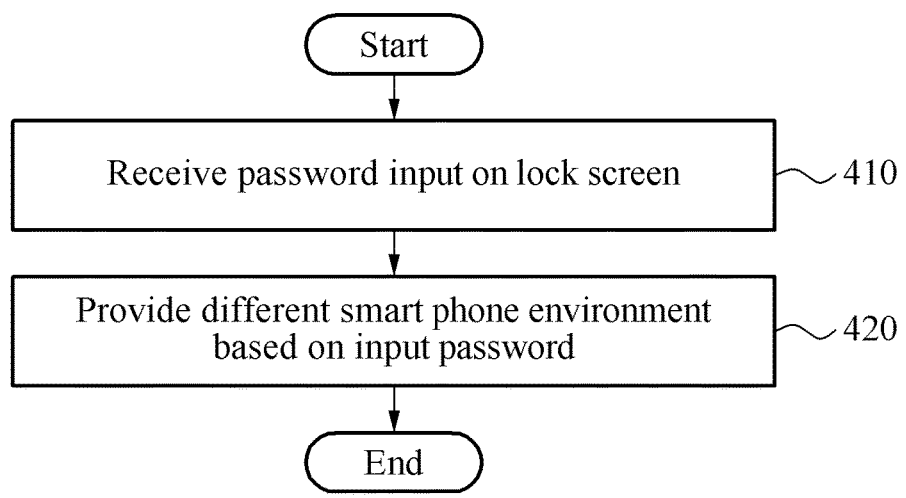
FIG. 4 is a flowchart illustrating an operating method of a smart phone according to an embodiment.

FIG. 4 is a flowchart illustrating an operating method of a smart phone according to an embodiment.

The operating method of the smart phone may be performed by the smart phone. In this regard, the description provided with reference to FIG. 1 may apply thereto. A method of receiving a password being input and providing a different smart phone environment based on the input password will be described in detail.

In operation 410, the smart phone may receive a password input on a lock screen. For example, a password may be set up for the smart phone before the input password is received.

In operation 420, the smart phone may provide a different smart phone environment based on the input password. When the password input into the smart phone is a first password, the smart phone may be unlocked and a first OS may be run. When the password input into the smart phone is a second password, the smart phone may be unlocked and a second OS may be run. In this example, when the input password is the first password, the smart phone may be unlocked and a first launcher may be run. When the input password is the second password, the smart phone may be unlocked and a second launcher may be run.

Figure 5:
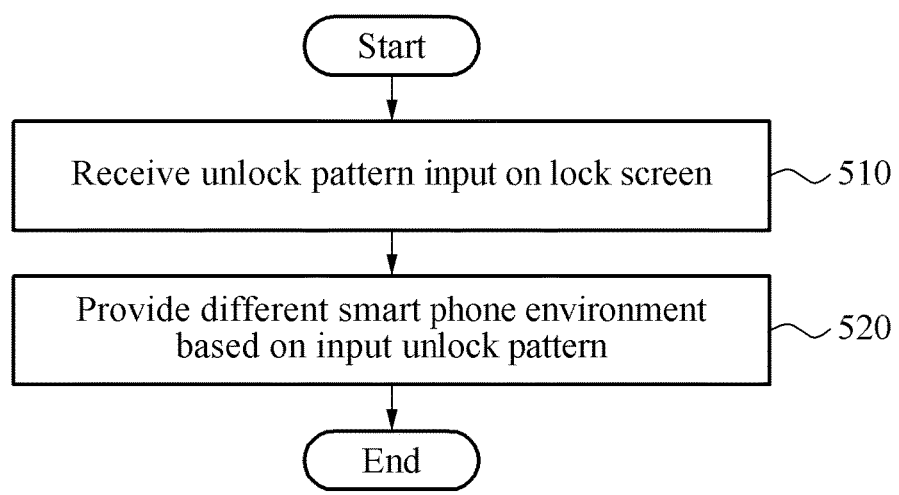
FIG. 5 is a flowchart illustrating an operating method of a smart phone according to an embodiment.

FIG. 5 is a flowchart illustrating an operating method of a smart phone according to an embodiment.

The operating method of the smart phone may be performed by the smart phone. In this regard, the description provided with reference to FIG. 2 may apply thereto. A method of receiving an unlock pattern being input and providing a different smart phone environment based on the input unlock pattern will be described in detail.

In operation 510, the smart phone may receive an unlock pattern input on a lock screen. For example, an unlock pattern may be set up for the smart phone before the input unlock pattern is received.

In operation 520, the smart phone may provide a different smart phone environment based on the input unlock pattern. When the unlock pattern input into the smart phone is a first unlock pattern, the smart phone may be unlocked and a first OS may be run. When the unlock pattern input into the smart phone is a second unlock pattern, the smart phone may be unlocked and a second OS may be run. In this example, when the input unlock pattern is the first unlock pattern, the smart phone may be unlocked and a first launcher may be run. When the input unlock pattern is the second unlock pattern, the smart phone may be unlocked and a second launcher may be run.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

The invention claimed is:

1. An operating method of a smart phone, the operating method comprising:
   receiving a password input on a lock screen of the smart phone;
   providing a different smart phone environment based on the input password,
   unlocking the smart phone and running a first operating system (OS) when the input password is a first password; and
   unlocking the smart phone and running a second OS when the input password is a second password,
   wherein the unlocking of the smart phone and running of the first OS comprises installing the first OS on the smart phone through a cloud system and running the first OS when the first OS is not installed on the smart phone, and
   the unlocking of the smart phone and running of the second OS comprises installing the second OS on the smart phone through the cloud system and running the second OS when the second OS is not installed on the smart phone.

2. An operating method of a smart phone, the operating method comprising:
   receiving an unlock pattern input on a lock screen of the smart phone;
   providing a different smart phone environment based on the input unlock pattern; and
   unlocking the smart phone; the smart phone running a first operating system (OS) when the input unlock pattern is a first unlock pattern; and
   unlocking the smart phone; the smart phone running a second OS when the input unlock pattern is a second unlock pattern;
   wherein the unlocking of the smart phone and running of the first OS comprises installing the first OS on the smart phone through a cloud system and running the first OS when the first OS is not installed on the smart phone, and
   the unlocking of the smart phone and running of the second OS comprises installing the second OS on the smart phone through the cloud system and running the second OS when the second OS is not installed on the smart phone.

* * * * *